(No Model.)
E. A. RIX.
Air Compressor.
No. 235,296.            Patented Dec. 7, 1880.
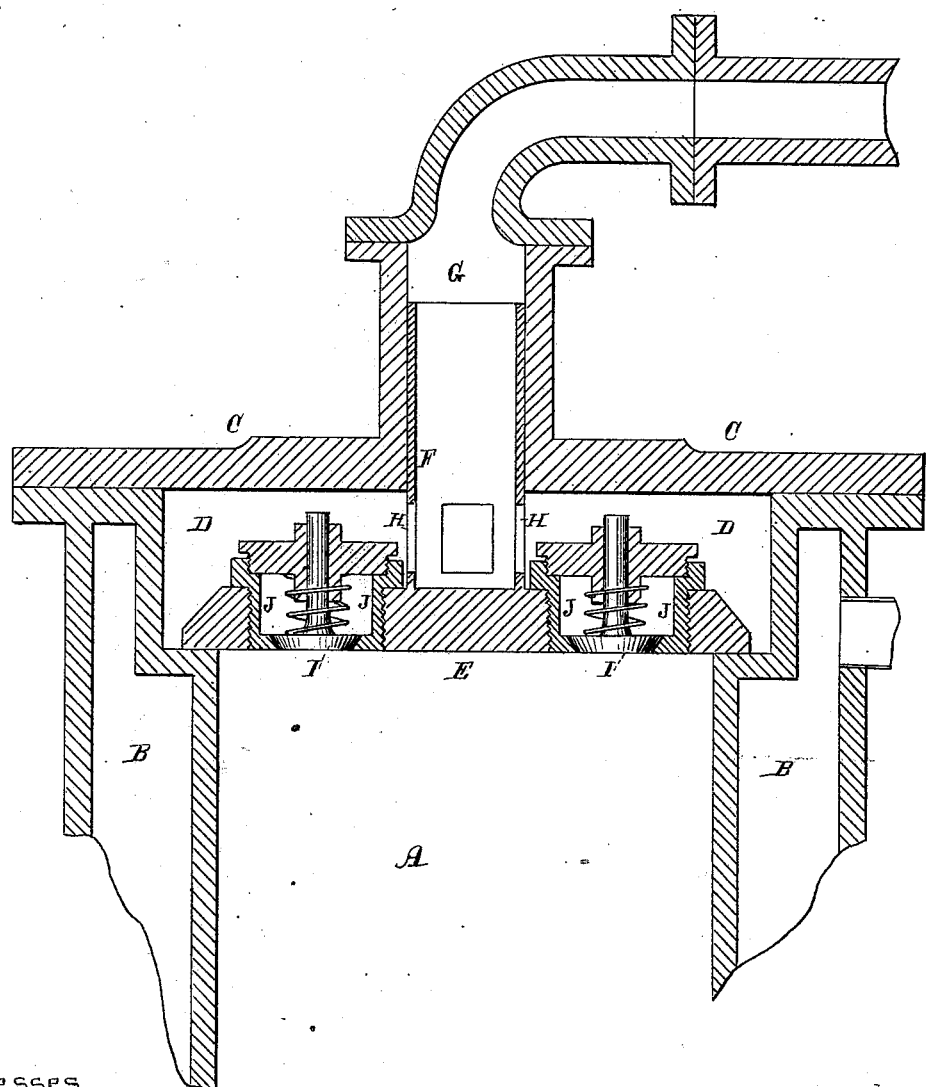

UNITED STATES PATENT OFFICE.

EDWARD A. RIX, OF SAN FRANCISCO, CALIFORNIA.

AIR-COMPRESSOR.

SPECIFICATION forming part of Letters Patent No. 235,296, dated December 7, 1880.

Application filed August 9, 1880. (No model.)

*To all whom it may concern:*

Be it known that I, EDWARD A. RIX, of the city and county of San Francisco, and State of California, have invented an Improved Air-Compressor; and I hereby declare the following to be a full, clear, and exact description thereof.

My invention relates to certain improvements in air-compressors; and it consists in the peculiar construction of the safety-head and its guiding-tube, as will be more fully described by reference to the accompanying drawing, which is a vertical section of the upper or discharge end of the cylinder.

A is the cylinder, having the surrounding water-space B, and C is the cylinder-head. The upper end of the cylinder has an enlarged space, D, within which the safety-head E is placed, resting upon a seat within this space, as shown. This head has an extension, F, which is fitted to the interior of the guide and discharge passage G, so as to guide and steady the head if it should be lifted from its seat.

The sides of the extension are perforated with openings H, through which the air escapes from the space D into the discharge-passage.

The head E is perforated to receive the valve-seats J, and the valves I are fitted to open upward as the piston compresses the air upward. The air escapes through the valves into the space D, and thence through the openings H into the passage G, through which it passes to the conveying-pipe.

The office of the safety-head is to rise if the piston should pass beyond the bore of the cylinder, and thus prevent any accident; but while the piston does not pass beyond its proper stroke this head will remain stationary, while the air will be discharged, in any case, through the valves I.

It will thus be seen that while I provide a head which renders it safe to run the piston close to it at every stroke without endangering any part, if any foreign substance should get between them I am enabled to use discharge-valves of so much smaller area that there will not be so great a loss of power in opening these valves as would be the case if I employed a single large valve having the same area of opening as that of the cylinder. It is also easier to keep the smaller valves and seats tight than if a single large valve were used.

Having thus described my invention, what I claim as new, and desire to secure by Letters Patent, is—

1. In combination with the compressing-cylinder A, having the enlarged air-chamber D, the safety-head E and the guiding-tube F, having openings H and valves I, substantially as described.

2. A safety-head, E, having a guide-tube provided with openings, in combination with an air-chamber surrounding such tube.

In witness whereof I have hereunto set my hand.

EDWARD A. RIX.

Witnesses:
 FRANK A. BROOKS,
 JOSEPH A. BAYLESS.